United States Patent
Hsu et al.

(10) Patent No.: US 9,959,142 B2
(45) Date of Patent: May 1, 2018

(54) DYNAMIC TASK SCHEDULING METHOD FOR DISPATCHING SUB-TASKS TO COMPUTING DEVICES OF HETEROGENEOUS COMPUTING SYSTEM AND RELATED COMPUTER READABLE MEDIUM

(71) Applicant: MEDIATEK INC., Hsin-Chu (TW)

(72) Inventors: Che-Ming Hsu, Miaoli County (TW); Tzu-Hung Yen, Hsinchu County (TW); Yu-Mao Kao, Hsinchu (TW); Shih-Chieh Huang, New Taipei (TW); Ting-Chang Huang, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 9 days.

(21) Appl. No.: 14/727,887

(22) Filed: Jun. 2, 2015

(65) Prior Publication Data
US 2015/0363239 A1 Dec. 17, 2015

Related U.S. Application Data

(60) Provisional application No. 62/013,515, filed on Jun. 17, 2014.

(51) Int. Cl.
*G06F 9/46* (2006.01)
*G06F 9/50* (2006.01)

(52) U.S. Cl.
CPC .......... *G06F 9/5033* (2013.01); *G06F 9/5044* (2013.01); *Y02B 60/142* (2013.01)

(58) Field of Classification Search
CPC .............................. G06F 9/5033; G06F 9/5044
(Continued)

(56) References Cited

U.S. PATENT DOCUMENTS 5,428,783 A * 6/1995 Lake .................. G06F 8/45
718/106
7,650,601 B2 * 1/2010 Aguilar, Jr. ........... G06F 9/4843
718/103
(Continued)

FOREIGN PATENT DOCUMENTS

CN 102480512 A 5/2012
CN 103713949 A 4/2014
(Continued)

OTHER PUBLICATIONS

Kalogeraki et al., "Dynamic Scheduling of Distributed Method Invocations", 2000, IEEE.*
(Continued)

*Primary Examiner* — Anna Deng
*Assistant Examiner* — Junchun Wu
(74) *Attorney, Agent, or Firm* — Winston Hsu (57) ABSTRACT

One dynamic task scheduling method includes: receiving a task, wherein the task comprises a kernel and a plurality of data items to be processed by the kernel; dynamically partitioning the task into a plurality of sub-tasks, each having the kernel and a variable-sized portion of the data items; and dispatching the sub-tasks to a plurality of computing devices of a heterogeneous computing system. Another dynamic task scheduling method includes: receiving a task, wherein the task comprises a kernel and a plurality of data items to be processed by the kernel; partitioning the task into a plurality of sub-tasks, each having the kernel and a same fixed-sized portion of the data items; and dynamically dispatching the sub-tasks to a plurality of computing devices of a heterogeneous computing system.

14 Claims, 9 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 8,707,314 | B2* | 4/2014 | Gummaraju | G06F 9/5044 |
| | | | | 718/102 |
| 9,280,395 | B2* | 3/2016 | Jiang | G06F 8/52 |
| 9,430,281 | B2* | 8/2016 | Sander | G06F 9/4881 |
| 9,645,854 | B2* | 5/2017 | Sander | G06F 9/5044 |
| 2005/0125793 | A1 | 6/2005 | Aguilar, Jr. | |
| 2007/0106995 | A1* | 5/2007 | Osaka | G06Q 10/06 |
| | | | | 718/106 |
| 2008/0115143 | A1* | 5/2008 | Shimizu | G06F 9/5066 |
| | | | | 718/105 |
| 2008/0134029 | A1* | 6/2008 | Shelton | G06F 17/30398 |
| | | | | 715/700 |
| 2009/0282413 | A1* | 11/2009 | Cialini | G06F 9/4881 |
| | | | | 718/102 |
| 2010/0205606 | A1* | 8/2010 | Panzer | G06F 9/4425 |
| | | | | 718/102 |
| 2011/0138397 | A1* | 6/2011 | Kikuchi | G06F 11/3476 |
| | | | | 718/106 |
| 2012/0095908 | A1* | 4/2012 | Barrie | G06Q 10/06 |
| | | | | 705/39 |
| 2012/0124591 | A1* | 5/2012 | Cadambi | G06F 9/505 |
| | | | | 718/103 |
| 2012/0266176 | A1* | 10/2012 | Vojnovic | G06F 9/5038 |
| | | | | 718/104 |
| 2012/0297163 | A1* | 11/2012 | Breternitz | G06F 9/4856 |
| | | | | 712/22 |
| 2013/0160016 | A1* | 6/2013 | Gummaraju | G06F 9/5044 |
| | | | | 718/102 |
| 2013/0339978 | A1 | 12/2013 | Sander | |
| 2014/0082041 | A1* | 3/2014 | Kurihara | H04L 43/00 |
| | | | | 709/201 |
| 2014/0380322 | A1* | 12/2014 | Ailamaki | G06F 9/4843 |
| | | | | 718/102 |
| 2015/0178124 | A1* | 6/2015 | Modani | G06F 9/4881 |
| | | | | 718/102 |
| 2015/0215173 | A1* | 7/2015 | Dutta | G06F 9/505 |
| | | | | 709/226 |
| 2015/0339158 | A1* | 11/2015 | Harris | G06F 9/4881 |
| | | | | 718/103 |
| 2015/0339164 | A1* | 11/2015 | Muthiah | G06F 9/5011 |
| | | | | 718/104 |

FOREIGN PATENT DOCUMENTS

| | | |
|---|---|---|
| WO | 2012099693 A2 | 7/2012 |
| WO | 2012155010 A1 | 11/2012 |
| WO | 2013090788 A1 | 6/2013 |

OTHER PUBLICATIONS

Chen et al., "Dynamic Task Scheduling and Processing Element Allocation for Multi-Function SoCs", 2007, IEEE.*
Wu et al., "Dynamic Task Allocation Models for Large Distributed Computing Systems", vol. 6, No. 12, Dec. 1995, IEEE.*
Wen et al., "Smart Multi-Task Scheduling for OpenCL Programs on CPU/GPU HeterogeneousPlatforms", Dec. 2014, IEEE.*

* cited by examiner

DYNAMIC TASK SCHEDULING METHOD FOR DISPATCHING SUB-TASKS TO COMPUTING DEVICES OF HETEROGENEOUS COMPUTING SYSTEM AND RELATED COMPUTER READABLE MEDIUM

CROSS REFERENCE TO RELATED APPLICATIONS

This application claims the benefit of U.S. provisional application No. 62/013,515, filed on Jun. 17, 2014 and incorporated herein by reference.

BACKGROUND

The disclosed embodiments of the present invention relate to a task scheduler design, and more particularly, to a dynamic task scheduling method for dispatching sub-tasks to computing devices of a heterogeneous computing system and a related computer readable medium.

A multi-processor system becomes popular nowadays due to advance of the semiconductor process. Regarding a heterogeneous computing system, it has processors that are not identical. For example, the heterogeneous computing system may include at least one first processor (e.g., one or more central processing units (CPUs)) and at least one second processor (e.g., one or more graphics processing units (GPUs)), where each first processor may have first processor architecture (e.g., first instruction set architecture), and each second processor may have second processor architecture (e.g., second instruction set architecture) that is different from the first processor architecture. Hence, if the same task is running on the first processor and the second processor, instructions executed by the first processor are different from that executed by the second processor.

Several frameworks have been developed to enable programs, each including one or more tasks, running on a heterogeneous computing environment, such as OpenCL (Open Computing Language) and Heterogeneous System Architecture (HSA). Taking OpenCL for example, it is a framework for writing programs that can be executed across heterogeneous platforms consisting of CPUs, GPUs and other processors (e.g., digital signal processors (DSPs)). Specifically, OpenCL is an open standard for parallel programming of heterogeneous computing systems. Typically, computing device(s) of a heterogeneous computing system being selected to run the tasks of an OpenCL program is (are) statically determined by the programmer. Furthermore, in a case of executing a task of the OpenCL program on multiple devices in parallel, the programmer needs to statically partition the task into sub-tasks according to the number of the devices and assign one of the sub-tasks to each device.

However, such a static task scheduler design with static task partitioning could make the heterogeneous computing system have lower throughput, and cannot guarantee load balance of different processors in the heterogeneous computing system.

SUMMARY

In accordance with exemplary embodiments of the present invention, a dynamic task scheduling method for dispatching sub-tasks to computing devices of a heterogeneous computing system and a related computer readable medium are proposed to solve the above-mentioned problem.

According to a first aspect of the present invention, an exemplary dynamic task scheduling method is disclosed. The exemplary dynamic task scheduling method includes: receiving a task, wherein the task comprises a kernel and a plurality of data items to be processed by the kernel; dynamically partitioning the task into a plurality of sub-tasks, each having the kernel and a variable-sized portion of the data items; and dispatching the sub-tasks to a plurality of computing devices of a heterogeneous computing system.

According to a second aspect of the present invention, an exemplary dynamic task scheduling method is disclosed. The exemplary dynamic task scheduling method includes: receiving a task, wherein the task comprises a kernel and a plurality of data items to be processed by the kernel; partitioning the task into a plurality of sub-tasks, each having the kernel and a same fixed-sized portion of the data items; and dynamically dispatching the sub-tasks to a plurality of computing devices of a heterogeneous computing system.

According to a third aspect of the present invention, an exemplary non-transitory computer readable medium is disclosed. The exemplary non-transitory computer readable medium stores a program code that, when executed by a heterogeneous computing system, causes the heterogeneous computing system to execute following steps: receiving a task, wherein the task comprises a kernel and a plurality of data items to be processed by the kernel; dynamically partitioning the task into a plurality of sub-tasks, each having the kernel and a variable-sized portion of the data items; and dispatching the sub-tasks to a plurality of computing devices of the heterogeneous computing system.

According to a fourth aspect of the present invention, an exemplary non-transitory machine readable medium is disclosed. The exemplary non-transitory machine readable medium stores a program code that, when executed by a heterogeneous computing system, causes the heterogeneous computing system to execute following steps: receiving a task, wherein the task comprises a kernel and a plurality of data items to be processed by the kernel; partitioning the task into a plurality of sub-tasks, each having the kernel and a same fixed-sized portion of the data items; and dynamically dispatching the sub-tasks to a plurality of computing devices of the heterogeneous computing system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
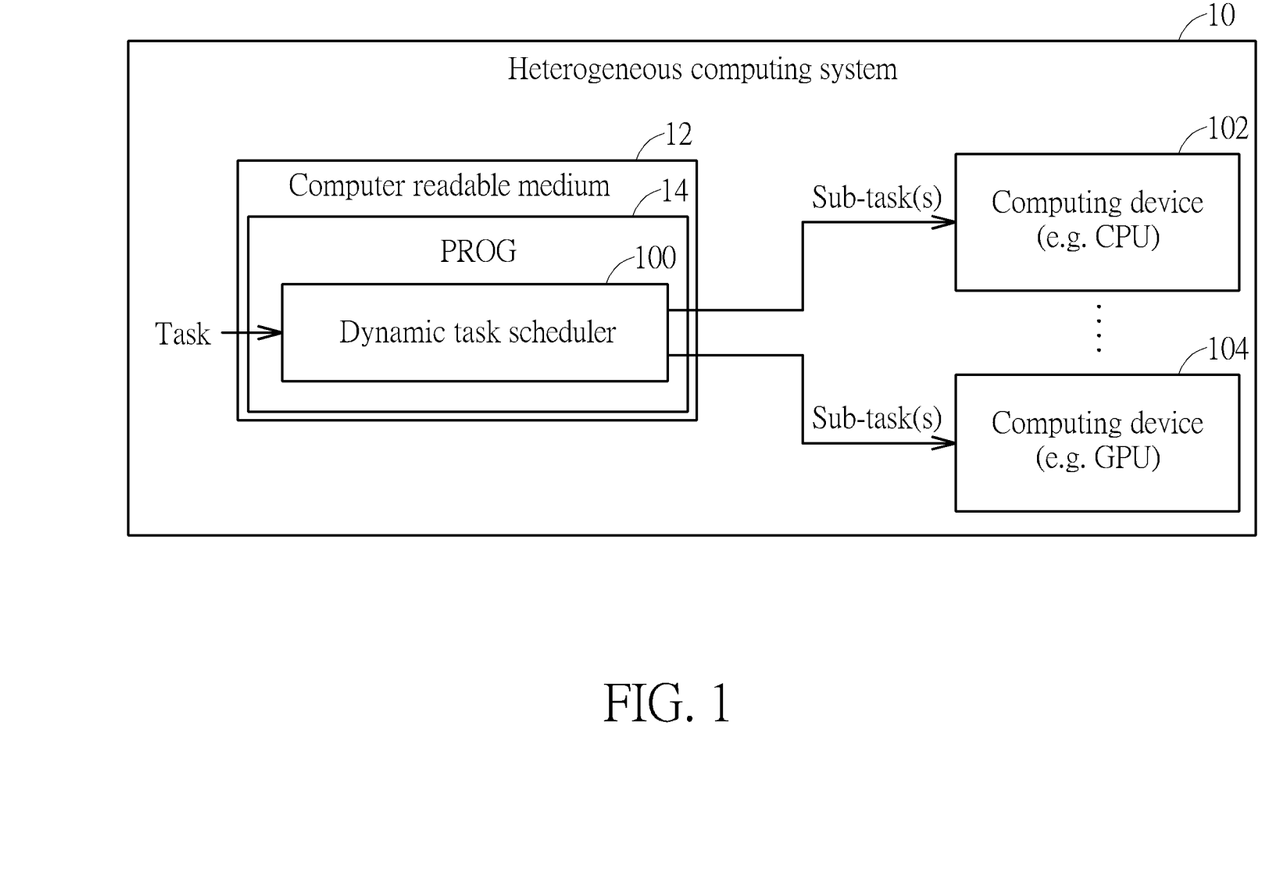
FIG. 1 is a diagram illustrating a heterogeneous computing system according to an embodiment of the present invention.

FIG. 1 is a diagram illustrating a heterogeneous computing system according to an embodiment of the present invention. The heterogeneous computing system 10 may be implemented in a portable device, such as a mobile phone, a tablet, a wearable device, etc. However, this is not meant to be a limitation of the present invention. That is, any electronic device using the proposed dynamic task scheduling method falls within the scope of the present invention. In this embodiment, the heterogeneous computing system 10 may have a dynamic task scheduler 100 and a plurality of computing devices 102 and 104. The task scheduler 100 is coupled to the computing devices 102 and 104, and arranged to perform the proposed dynamic task scheduling method which is used to partition one task into a plurality of sub-tasks and dispatch the sub-tasks to the computing devices 102 and 104. By way of example, but not limitation, the dynamic task scheduler 100 may be part of an operating system (OS) supporting a heterogeneous computing environment. Hence, the dynamic task scheduler 100 may be a software module running on the heterogeneous computing system 10. As shown in FIG. 1, the heterogeneous computing system 10 may have a computer readable medium 12 such as a memory device. The computer readable medium 12 may store a program code (PROG) 14. When the program code 14 is loaded and executed by the heterogeneous computing system 10, the dynamic task scheduler 100 may perform the proposed dynamic task scheduling method which will be detailed later.

The computing device 102 and 104 may be processors with different instruction set architecture. For example, the computing device 102 may be a CPU, and the computing device 104 may be a GPU. For clarity and simplicity, only two computing devices 102 and 104 are illustrated in FIG. 1. In practice, the heterogeneous computing system 10 may have more than two computing devices, depending upon actual design consideration. For example, the heterogeneous computing system 10 may be modified to have more than one CPU and more than one GPU. For another example, the heterogeneous computing system 10 may be modified to have additional processor(s) of a different processor type. That is, the proposed dynamic task scheduling method may be applied to a heterogeneous computing system with any combination of processors.

In a first exemplary design, the dynamic task scheduler 100 is configured to employ a variable-group-size partitioning scheme for partitioning a task into a plurality of sub-tasks, where the task comprises a kernel and a plurality of data items to be processed by the kernel, and each of the sub-tasks comprises the same kernel and a variable-sized portion of the data items. Consider a case where the OpenCL framework is supported by the heterogeneous computing system 10, the data items may be the output data related to the work-items in OpenCL (e.g., pixels of an image), and the kernel may be a program code (basically, an OpenCL function) for each of the work-items. Hence, pixels of an image may be split into a plurality of pixel groups with variable sizes dynamically determined by the dynamic task scheduler 100.

Figure 2:
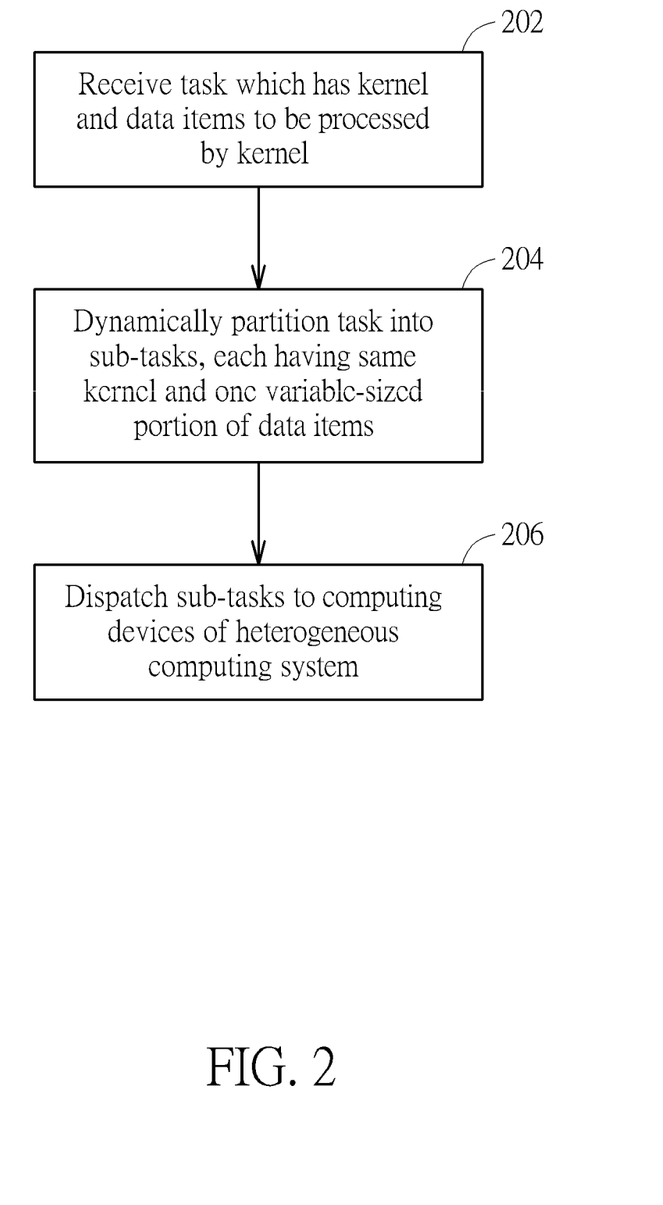
FIG. 2 is a flowchart illustrating a first dynamic task scheduling method according to an embodiment of the present invention.

FIG. 2 is a flowchart illustrating a first dynamic task scheduling method according to an embodiment of the present invention. The dynamic task scheduling method may be employed by the dynamic task scheduler 100 running on the heterogeneous computing system 10, and may be briefly summarized as below.

Step 202: Receive a task, wherein the task comprises a kernel and a plurality of data items to be processed by the kernel.

Step 204: Dynamically partition the task into a plurality of sub-tasks, each having the same kernel and a variable-sized portion of the data items.

Step 206: Dispatch the sub-tasks to a plurality of computing devices of a heterogeneous computing system.

Figure 3:
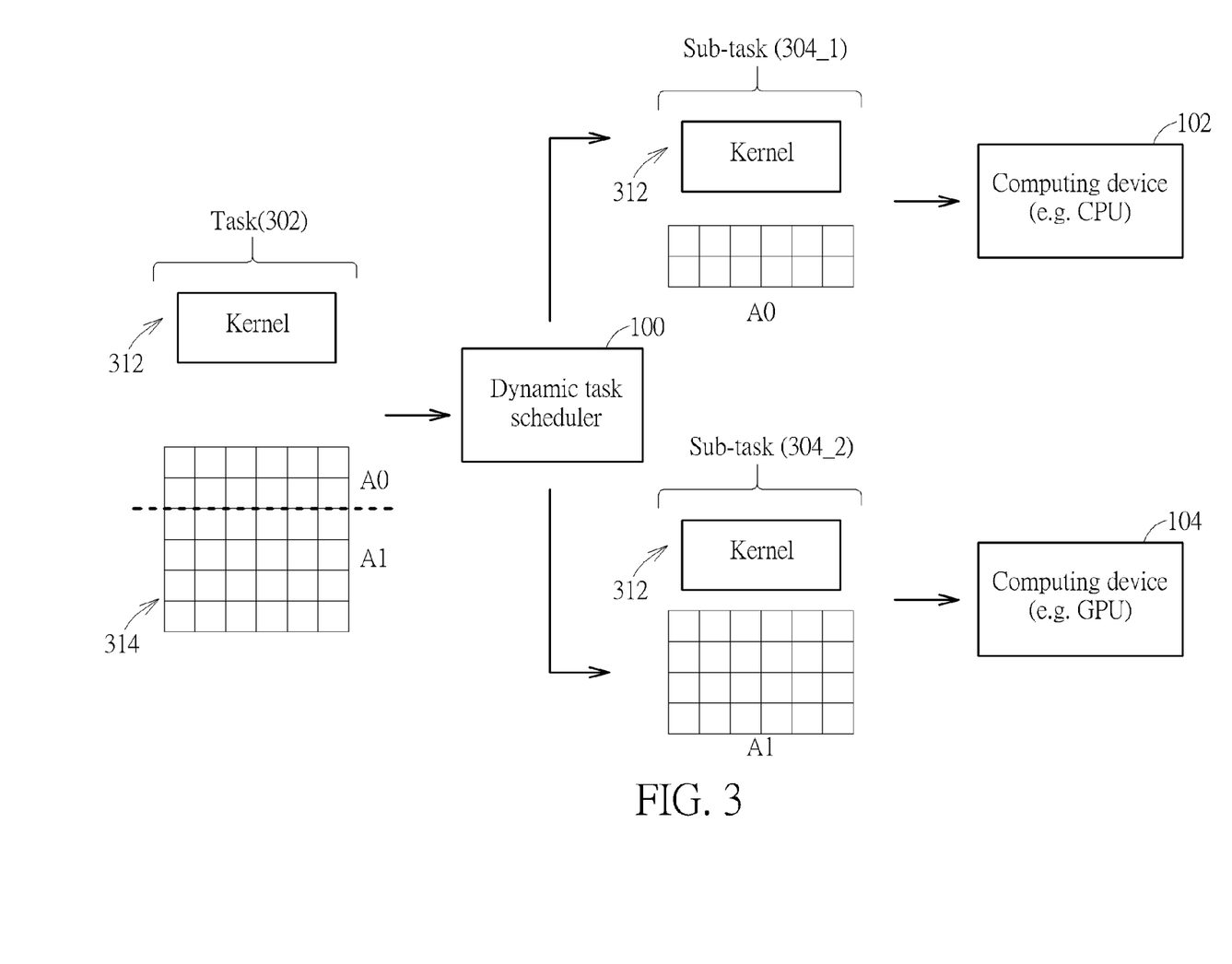
FIG. 3 is a diagram illustrating a first example of splitting one task into multiple sub-tasks.

A task may be used to apply the same kernel (i.e., the same function) to each of a plurality of data items (e.g., a plurality of pixels in an image). To achieve higher throughput, lower power consumption and lower response time, the dynamic task scheduler 100 may employ a variable-group-size partitioning scheme for partitioning a task into a plurality of sub-tasks. Specifically, after receiving a task, the dynamic task scheduler 100 is configured to dynamically partition the task into sub-tasks, each having the same kernel and a variable-sized portion of the data items (step 204). FIG. 3 is a diagram illustrating an example of splitting one task 302 (which contains a kernel 312 and a plurality of data items 314 to be processed by the kernel 312) into two sub-tasks 304_1 and 304_2, where the sub-task 304_1 includes the same kernel 312 and a first portion A0 of the data items 314, and the sub-task 304_2 includes the same kernel 312 and a second portion A1 of the data items 314. It should be noted that the size of the first portion A0 and the size of the second portion A1 are dynamically determined by the dynamic task scheduler 100. Hence, the size of the first portion A0 is not necessarily the same as the size of the second portion A1. In this example, the size of the first portion A0 is different from the size of the second portion A1.

Figure 4:
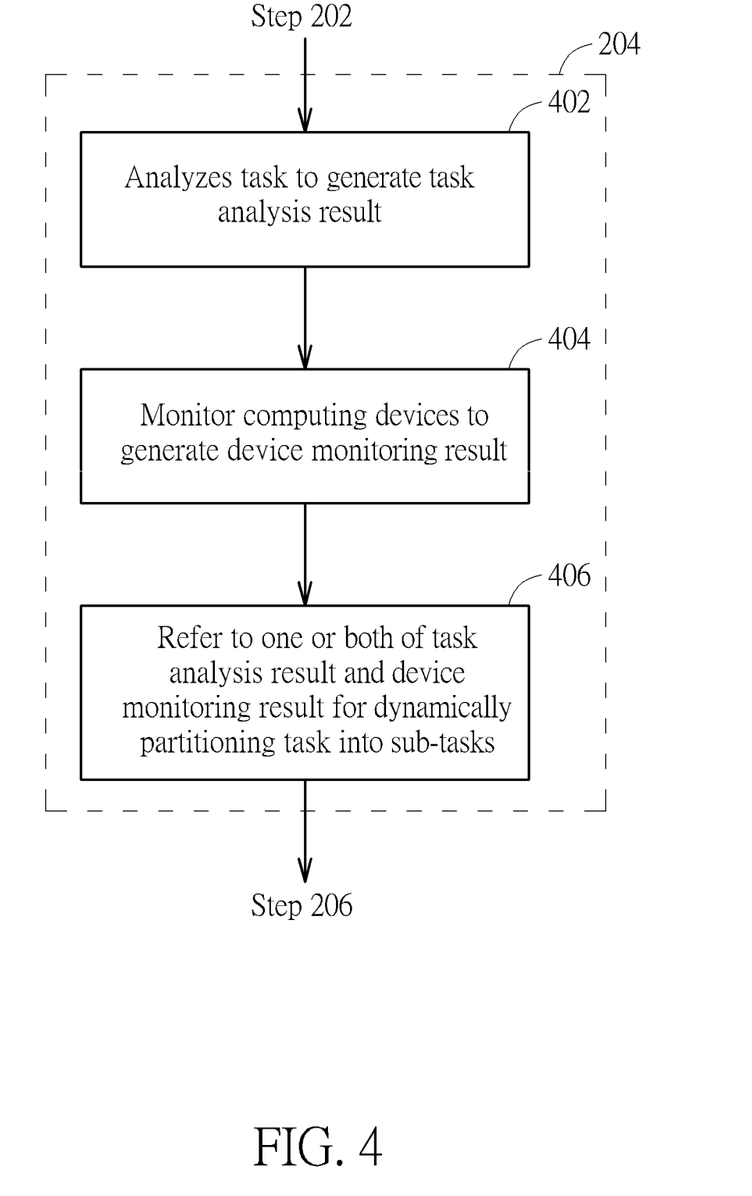
FIG. 4 is a flowchart illustrating an exemplary embodiment of step 204 shown in FIG. 2.

Please refer to FIG. 3 in conjunction with FIG. 4. FIG. 4 is a flowchart illustrating an exemplary embodiment of the step 204 shown in FIG. 2. In step 402, the dynamic task scheduler 100 analyzes the task 302 to generate a task analysis result. For example, the dynamic task scheduler 100 may perform a task context analysis upon the task 302 to generate an affinity analysis result. Since the computing devices 102 and 104 have different instruction set architecture, some kernels may prefer one of the computing devices 102 and 104 for execution, and some kernels may prefer the other of the computing devices 102 and 104 for execution.

In other words, the performance of executing a first kernel in the computing device (e.g., CPU) 102 may be better than that of executing the same first kernel in the computing device (e.g., GPU) 104, and the performance of executing a second kernel in the computing device (e.g., GPU) 104 may be better than that of executing the same second kernel in the computing device (e.g., CPU) 102. Hence, the affinity analysis result of the task 302 can indicate the execution preference of the kernel 312 on one of the computing devices 102 and 104. When the kernel 312 of the task 302 prefers the computing device 102 for execution, the dynamic task scheduler 100 may set the size of the first portion A0 by a larger value. When the kernel 312 of the task 302 prefers the computing device 104 for execution, the dynamic task scheduler 100 may set the size of the second portion A1 by a larger value. However, this is for illustrative purposes only, and is not meant to be a limitation of the present invention.

Figure 5:
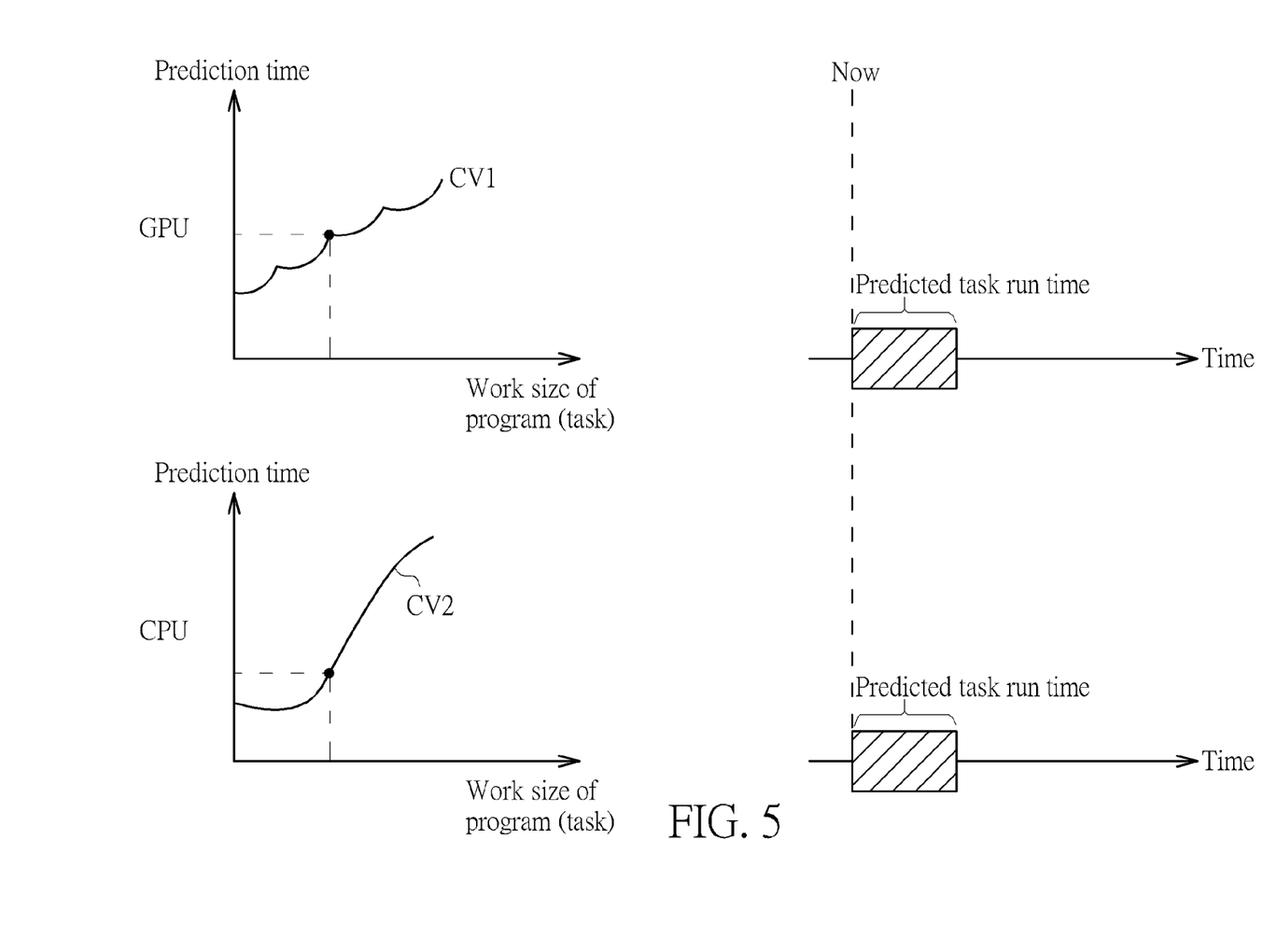
FIG. 5 is a diagram illustrating an example of determining a predicted task run time for each of different computing devices.

For another example, the dynamic task scheduler 100 may perform a task run time prediction upon the task 302 to obtain a predicted task run time for each of the computing devices 102 and 104. For example, the predicted task run time for each of the computing devices 102 and 104 may be determined according to previous results. FIG. 5 is a diagram illustrating an example of determining a predicted task run time for each of different computing devices. Assume that the computing device 102 is a CPU, and the computing device 104 is a GPU. One prediction model may be built for each of CPU and GPU according to previous task execution results. As shown in FIG. 5, the characteristic curve CV1 shows the mapping between the predicted task run time and the work size of the program (task) executed by the GPU, and the characteristic curve CV2 shows the mapping between the predicted task run time and the work size of the program (task) executed by the CPU. Hence, the dynamic task scheduler 100 may refer to the size of the work-items 314 and the prediction models to determine the predicted task run time for each of CPU and GPU. When the predicted task run time for the computing device (e.g., CPU) 102 is shorter than that for the computing device (e.g., GPU) 104, the dynamic task scheduler 100 may set the size of the first portion A0 by a larger value. When the predicted task run time for the computing device (e.g., GPU) 104 is shorter than that for the computing device (e.g., CPU) 102, the dynamic task scheduler 100 may set the size of the second portion A1 by a larger value. However, this is for illustrative purposes only, and is not meant to be a limitation of the present invention.

Figure 6:
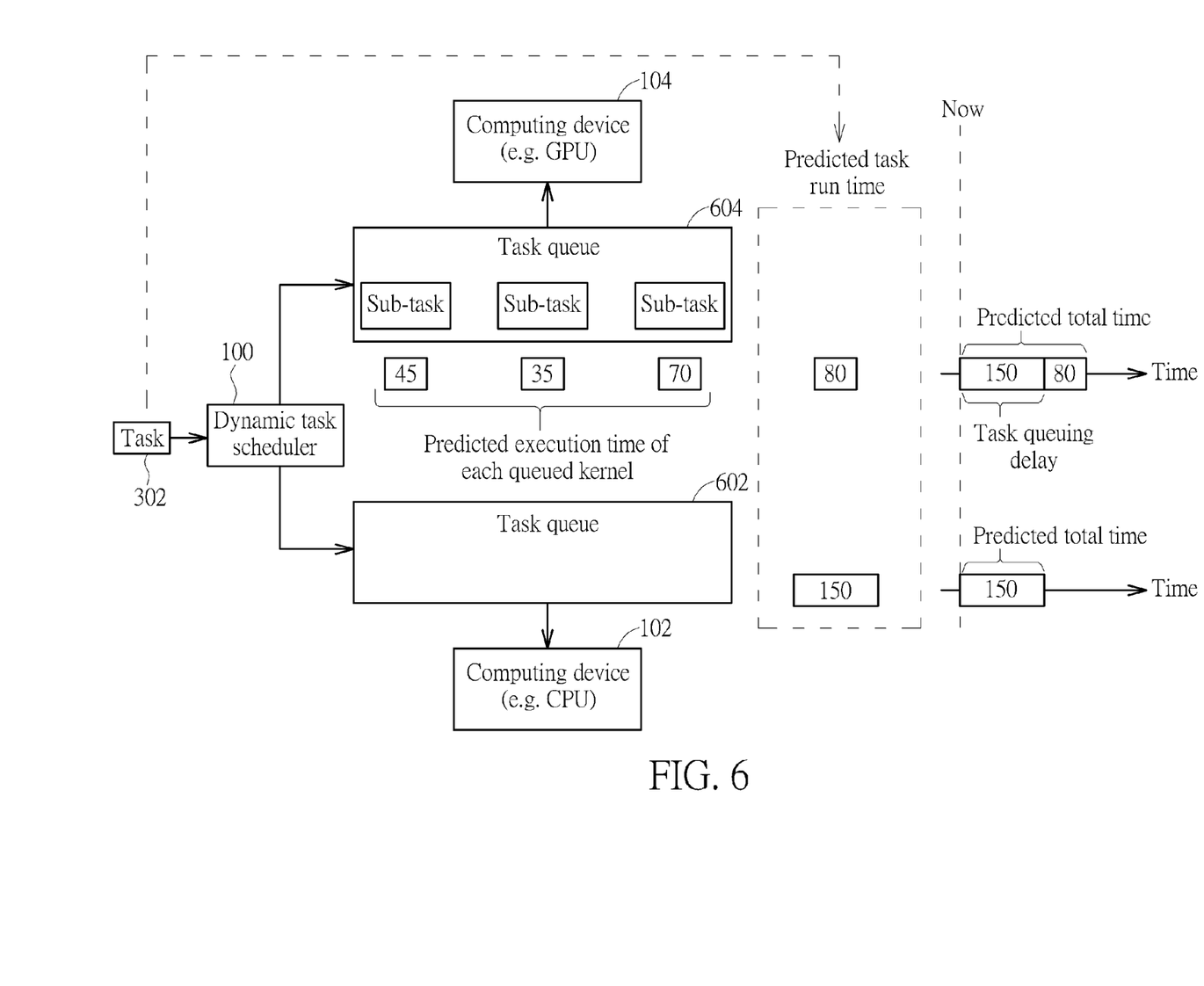
FIG. 6 is a diagram illustrating an example of determining an estimated task queuing delay of each of different computing devices.

In step 404, the dynamic task scheduler 100 monitors the computing devices 102 and 104 to generate a device monitoring result. For example, the dynamic task scheduler 100 may perform a task queuing delay estimation to determine an estimated task queuing delay of each of the computing devices 102 and 104. FIG. 6 is a diagram illustrating an example of determining an estimated task queuing delay of each of different computing devices. In this embodiment, each sub-task dispatched to the computing device (e.g., CPU) 102 is enqueued into a task queue 602, and one sub-task in the task queue 602 is dequeued and transmitted to the computing device (e.g., CPU) 102 for execution. Similarly, each sub-task dispatched to the computing device (e.g., GPU) 104 is enqueued into a task queue 604, and one sub-task in the task queue 604 is dequeued and transmitted to the computing device (e.g., GPU) 104 for execution. As mentioned above, when the task 302 is received by the dynamic task scheduler 100, the dynamic task scheduler 100 may perform a task run time prediction. In this example, the predicted task run time for the computing device (e.g., GPU) 104 is 80, and the predicted task run time for the computing device (e.g., CPU) 102 is 150. The task queue 604 of the computing device (e.g., GPU) 104 is not empty at the time the task 302 is received by the dynamic task scheduler 100. Hence, the task queuing delay of the computing device 104 is determined by the predicted execution time of each queued kernel (which is part of each queued sub-task in the task queue 604). In this example, the task queuing delay of the computing device 104 is set by a sum of the predicted execution time of all queued kernels in the task queue 604 (i.e., 45+35+70=150). However, the task queue 602 of the computing device (e.g., CPU) 102 is empty at the time the task 302 is received by the dynamic task scheduler 100. Hence, the task queuing delay of the computing device 102 is 0. For example, when the estimated task queuing delay of the computing device 102 is shorter than that for the computing device 104, the dynamic task scheduler 100 may set the size of the first portion A0 by a larger value. When the estimated task queuing delay of the computing device 104 is shorter than that for the computing device 102, the dynamic task scheduler 100 may set the size of the second portion A1 by a larger value. Moreover, when the task queuing delay of each of the computing devices 102 and 104 is considered, the predicted total time required to wait for an end of the task 302 on the computing device 104 is 230 (i.e., 150+80), and the predicted total time required to wait for an end of the task 302 on the computing device 102 is 150. Hence, in addition to the predicted task run time for the computing devices 102 and 104, the dynamic task scheduler 100 may further refer to the estimated task queuing delays associated with the computing devices 102 and 104 to determine the size of the first portion A0 and the size of the second portion A1. However, this is for illustrative purposes only, and is not meant to be a limitation of the present invention.

For another example, the dynamic task scheduler 100 may perform a device load monitoring operation to determine a device load of each of the computing devices 102 and 104. For example, when a device load of the computing device 102 is heavier than that of the computing device 104, the dynamic task scheduler 100 may set the size of the first portion A0 by a smaller value. In other words, when a device load of the computing device 104 is heavier than that of the computing device 102, the dynamic task scheduler 100 may set the size of the second portion A1 by a smaller value. However, this is for illustrative purposes only, and is not meant to be a limitation of the present invention.

For yet another example, the dynamic task scheduler 100 may perform a device limitation checking operation to determine a device limitation of each of the computing devices 102 and 104. For example, the device limitation may include a power limitation and/or a thermal limitation. When a margin between a current operating status of the computing device 102 and an associated device limitation of the computing device 102 is small, the dynamic task scheduler 100 may set the size of the first portion A0 by a smaller value. Similarly, when a margin between a current operating status of the computing device 104 and an associated device limitation of the computing device 104 is small, the dynamic task scheduler 100 may set the size of the second portion A1 by a smaller value. However, this is for illustrative purposes only, and is not meant to be a limitation of the present invention.

In step 406, the dynamic task scheduler 100 refers to one or both of the task analysis result (which may include an affinity analysis result and/or a predicted task run time for each computing device) and the device monitoring result (which may include an estimated task queuing delay of each computing device, a device load of each computing device, and/or a device limitation of each computing device) for dynamically partitioning the task 302 into the sub-tasks 304_1 and 304_2. Since the first portion A0 and the second portion A1 of the data items 314 are allowed to have variable sizes dynamically determined by the dynamic task scheduler 100, the number of sub-tasks 304_1 and 304_2 may be equal to the number of computing devices 102 and 104.

Figure 7:
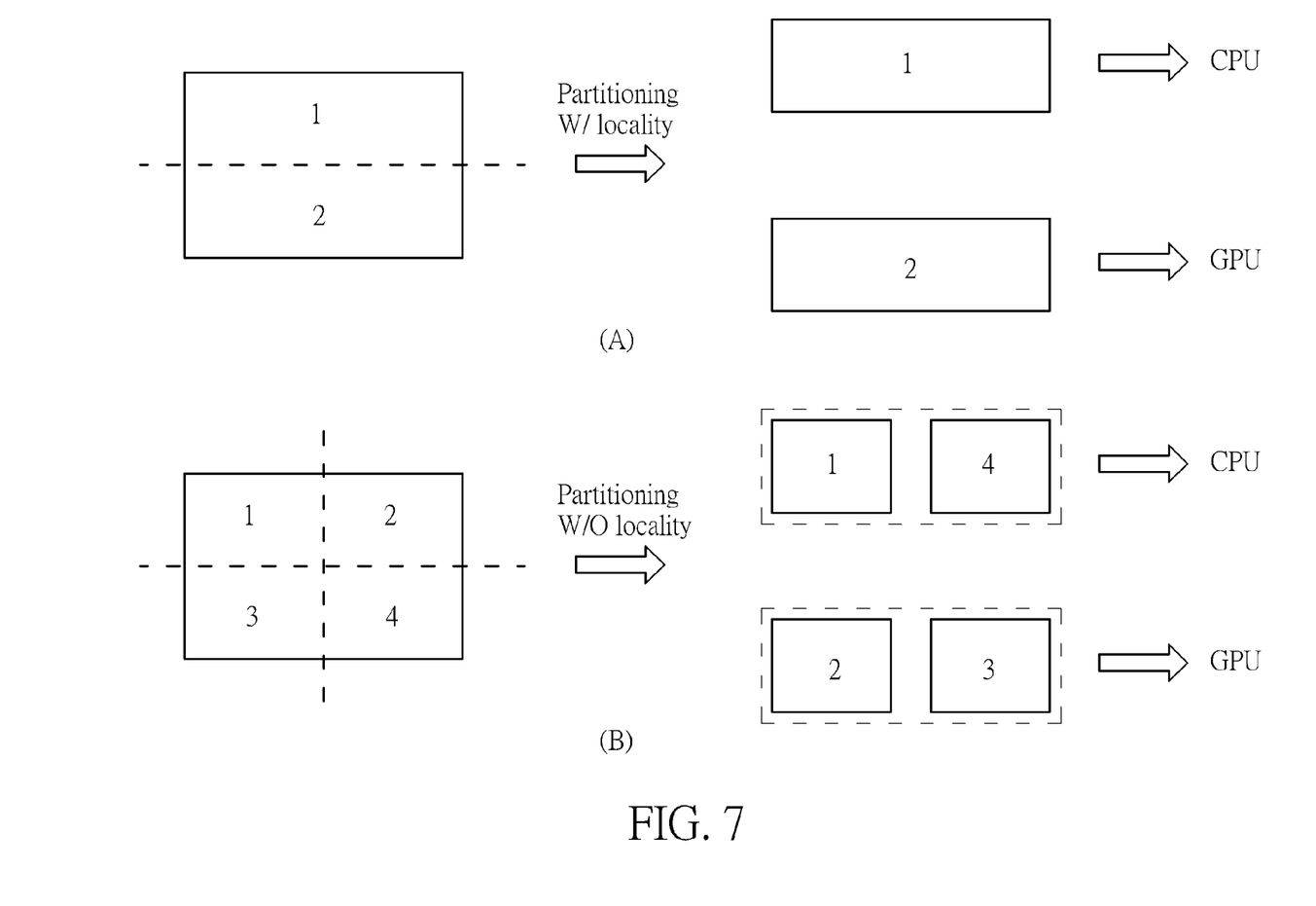
FIG. 7 is a diagram illustrating data partitions with locality and data partitions without locality according to an embodiment of the present invention.

Preferably, the data items 314 are partitioned with locality to improve the performance. FIG. 7 is a diagram illustrating data partitions with locality and data partitions without locality according to an embodiment of the present invention. Consider a case where the number of computing devices in a heterogeneous computing system is 2. As shown in sub-diagram (A) of FIG. 7, the data items of an image are partitioned with locality, such that one data partition is localized at the top half of the image, and the other data partition is localized at the bottom half of the image. As shown in sub-diagram (B) of FIG. 7, the data items of an image are partitioned without locality, such that one data partition includes data items located at regions in one diagonal direction of the image, and the other data partition includes data items located at regions in the other diagonal direction of the image. To achieve better performance, the dynamic task scheduler 100 preferably selects the partitioning manner shown in sub-diagram (A) of FIG. 7 to determine data items included in each sub-task.

After the sub-tasks 304_1 and 304_2 are determined by the dynamic task scheduler 100 (step 204), the dynamic task scheduler 100 dispatches the sub-task 304_1 (which includes the kernel 312 and the first portion A0 of the data items 314) to the computing device 102, and dispatches the sub-task 304_2 (which includes the kernel 312 and the second portion A1 of the data items 314) to the computing device 104 (step 206).

In a second exemplary design, the dynamic task scheduler 100 is configured to employ a fixed-group-size partitioning scheme for partitioning a task into a plurality of sub-tasks, where the task comprises a kernel and a plurality of data items to be processed by the kernel, and each of the sub-tasks comprises the same kernel and a same fixed-sized portion of the data items. Consider a case where the OpenCL framework is supported by the heterogeneous computing system 10, the data items may be the output data related to the work-items (e.g., pixels of an image), and the kernel may be a program code (basically, an OpenCL function) for each of the work-items. Hence, pixels of an image may be split into a plurality of pixel groups with the same size statically/dynamically determined by the dynamic task scheduler 100.

Figure 8:
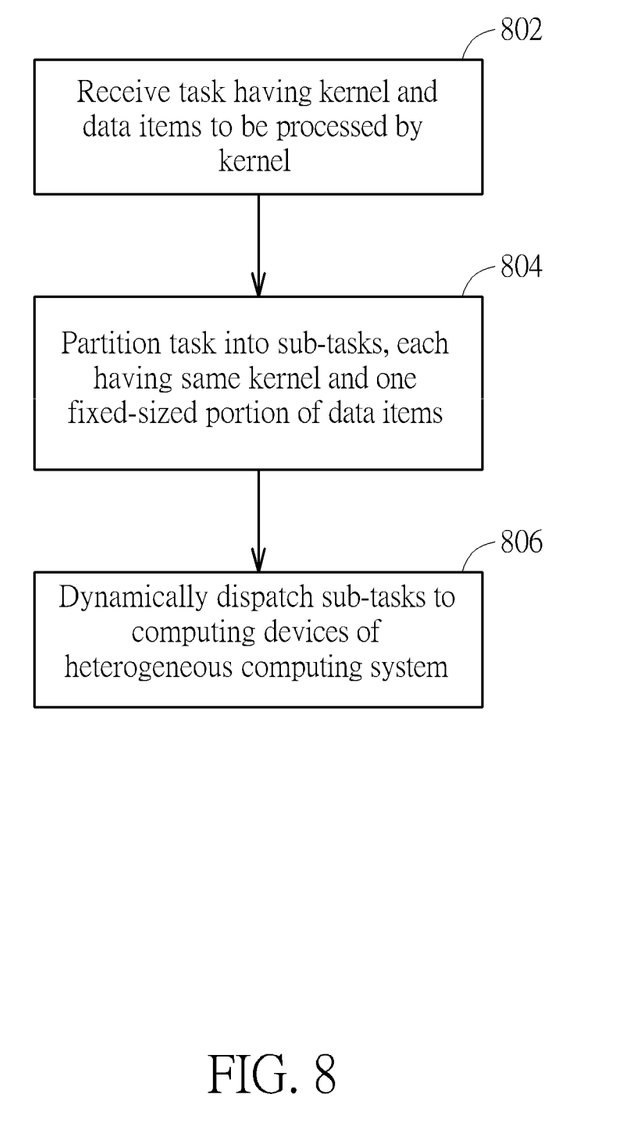
FIG. 8 is a flowchart illustrating a second dynamic task scheduling method according to an embodiment of the present invention.

FIG. 8 is a flowchart illustrating a second dynamic task scheduling method according to an embodiment of the present invention. The dynamic task scheduling method may be employed by the dynamic task scheduler 100 running on the heterogeneous computing system 10, and may be briefly summarized as below.

Step 802: Receive a task, wherein the task comprises a kernel and a plurality of data items to be processed by the kernel.

Step 804: Partition the task into a plurality of sub-tasks, each having the same kernel and a fixed-sized portion of the data items.

Step 806: Dynamically dispatch the sub-tasks to a plurality of computing devices of a heterogeneous computing system.

As mentioned above, a task may be used to apply the same kernel (i.e., the same function) to each of a plurality of data items (e.g., a plurality of pixels in an image). The dynamic task scheduler 100 employs a fixed-group-size partitioning scheme for partitioning a task into a plurality of sub-tasks. Specifically, the dynamic task scheduler 100 is configured to partition the task into sub-tasks, each having the same kernel and the same fixed-sized portion of the data items (step 804).

Figure 9:
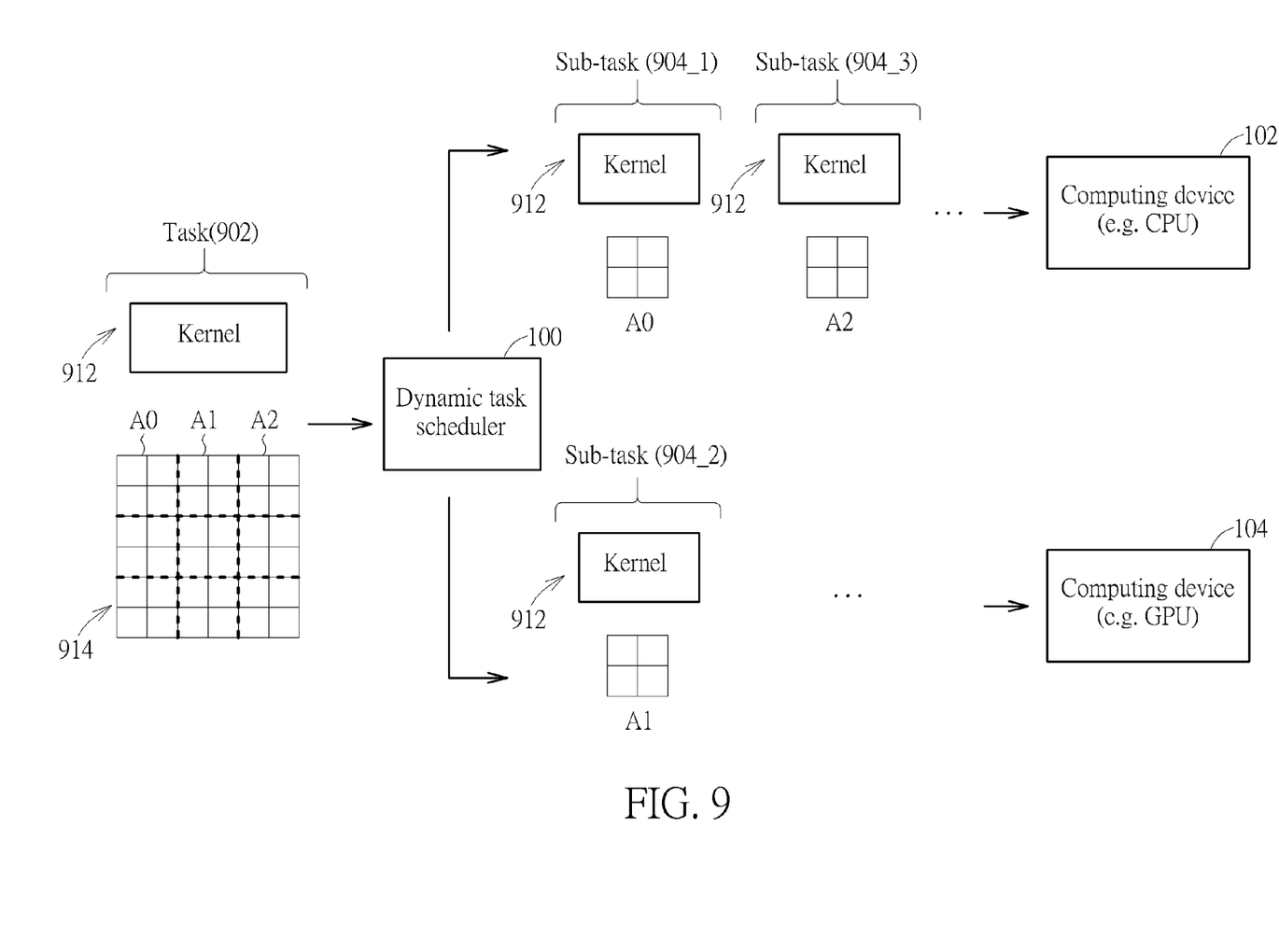
FIG. 9 is a diagram illustrating another example of splitting one task into multiple sub-tasks.

FIG. 9 is a diagram illustrating an example of splitting one task 902 (which contains a kernel 912 and a plurality of data items 914 to be processed by the kernel 912) into multiple sub-tasks (e.g., at least three sub-tasks 904_1, 904_2 and 904_3). As shown in FIG. 9, the sub-task 904_1 includes the same kernel 912 and a first portion A0 of the data items 914, the sub-task 904_2 includes the same kernel 912 and a second portion A1 of the data items 914, and the sub-task 904_3 includes the same kernel 912 and a third portion A2 of the data items 914. It should be noted that the first portion A0, the second portion A1 and the third portion A2 have the same size which may be a pre-defined value and is not changed for different tasks. Preferably, the data items 914 are partitioned with locality to improve the performance. For example, the dynamic task scheduler 100 may partition the task 902 into 9 sub-tasks, where the data items of an image are evenly split into 9 portions that are assigned to the sub-tasks respectively.

To achieve higher throughput, lower power consumption and lower response time, the dynamic task scheduler 100 dynamically dispatches the sub-tasks determined by the fixed-group-size partitioning scheme to the computing devices 102 and 104. In this example, the number of sub-tasks determined by the dynamic task scheduler 100 is larger than the number of the computing devices 102 and 104. When receiving a sub-task request from the computing device 102, the dynamic task scheduler 100 dispatches one sub-task derived from partitioning the task 902 to the computing device 102. Similarly, when receiving a sub-task request from the computing device 104, the dynamic task scheduler 100 dispatches one sub-task derived from partitioning the task 902 to the computing device 104. For example, each of the computing devices 102 and 104 may issue one sub-task request to the dynamic task scheduler 100 when it is capable of dealing with more sub-tasks. In this way, the load balance between the computing devices 102 and 104 can be achieved by dynamically dispatching sub-tasks, each having the same kernel and a data partition with a fixed size, to the computing devices 102 and 104 on demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic task scheduling method comprising:
   receiving a task, wherein the task comprises a kernel and a plurality of data items to be processed by the kernel;
   dynamically partitioning the task into a plurality of sub-tasks, each having the kernel and a variable-sized portion of the data items, wherein the data items of the task are partitioned into variable-sized portions of the sub-tasks, and variable sizes of the variable-sized portions are dynamically determined; and
   dispatching the sub-tasks to a plurality of computing devices of a heterogeneous computing system;
   wherein dynamically partitioning the task into the sub-tasks comprises:
   analyzing the task to generate a task analysis result; and dynamically partitioning the task into the sub-tasks according to at least the task analyzing result, wherein the variable sizes of the variable-sized portions are dynamically set based on at least the task analysis result;

wherein the task analysis result comprises an affinity analysis result; the computing devices comprise a first computing device and a second computing device; and when the affinity analysis result indicates that performance of executing the kernel in the first computing device is better than performance of executing the kernel in the second computing device, a size of a variable-sized portion included in a sub-task dispatched to the first computing device is set larger than a size of a variable-sized portion included in a sub-task dispatched to the second computing device.

2. The dynamic task scheduling method of claim 1, wherein a number of the sub-tasks is equal to a number of the computing devices.

3. A dynamic task scheduling method comprising:
receiving a task, wherein the task comprises a kernel and a plurality of data items to be processed by the kernel;
dynamically partitioning the task into a plurality of sub-tasks, each having the kernel and a variable-sized portion of the data items, wherein the data items of the task are partitioned into variable-sized portions of the sub-tasks, and variable sizes of the variable-sized portions are dynamically determined; and
dispatching the sub-tasks to a plurality of computing devices of a heterogeneous computing system;
wherein dynamically partitioning the task into the sub-tasks comprises:
analyzing the task to generate a task analysis result; and
dynamically partitioning the task into the sub-tasks according to at least the task analyzing result, wherein the variable sizes of the variable-sized portions are dynamically set based on at least the task analysis result;
wherein the task analysis result comprises a predicted task run time for each of the computing devices; the computing devices comprise a first computing device and a second computing device; and when a predicted task run time of the task executed by the first computing device is shorter than a predicted task run time of the task executed by the second computing device, a size of a variable-sized portion included in a sub-task dispatched to the first computing device is set larger than a size of a variable-sized portion included in a sub-task dispatched to the second computing device.

4. The dynamic task scheduling method of claim 1, wherein dynamically partitioning the task into the sub-tasks further comprises:
monitoring the computing devices to generate a device monitoring result; and
dynamically partitioning the task into the sub-tasks according to at least the device monitoring result.

5. The dynamic task scheduling method of claim 4, wherein the device monitoring result comprises an estimated task queuing delay of each of the computing devices; the computing devices comprise a first computing device and a second computing device; each sub-task dispatched to the first computing device is enqueued into a first task queue, and is dequeued from the first task queue and transmitted to the first computing device for execution; each sub-task dispatched to the second computing device is enqueued into a second task queue, and is dequeued from the second task queue and transmitted to the second computing device for execution; and when an estimated task queuing delay resulting from the first task queue is shorter than an estimated task queuing delay resulting from the second task queue, a size of a variable-sized portion included in a sub-task dispatched to the first computing device is set larger than a size of a variable-sized portion included in a sub-task dispatched to the second computing device.

6. The dynamic task scheduling method of claim 4, wherein the device monitoring result comprises a device load of each of the computing devices the computing devices comprise a first computing device and a second computing device; and when a device load of the second computing device is heavier than a device load of the first computing device, a size of a variable-sized portion included in a sub-task dispatched to the first computing device is set larger than a size of a variable-sized portion included in a sub-task dispatched to the second computing device.

7. The dynamic task scheduling method of claim 4, wherein the device monitoring result comprises a device limitation of each of the computing devices; and a size of a variable-sized portion included in a sub-task dispatched to said each of the computing devices is positively correlated to a margin between a current operating status of said each of the computing devices and the device limitation of said each of the computing devices.

8. A non-transitory computer readable medium storing a program code that, when executed by a heterogeneous computing system, causes the heterogeneous computing system to execute following steps:
receiving a task, wherein the task comprises a kernel and a plurality of data items to be processed by the kernel;
dynamically partitioning the task into a plurality of sub-tasks, each having the kernel and a variable-sized portion of the data items, wherein the data items of the task are partitioned into variable-sized portions of the sub-tasks, and variable sizes of the variable-sized portions are dynamically determined; and
dispatching the sub-tasks to a plurality of computing devices of the heterogeneous computing system;
wherein dynamically partitioning the task into the sub-tasks comprises:
analyzing the task to generate a task analysis result; and
dynamically partitioning the task into the sub-tasks according to at least the task analyzing result, wherein the variable sizes of the variable-sized portions are dynamically set based on at least the task analysis result;
wherein the task analysis result comprises an affinity analysis result; the computing devices comprise a first computing device and a second computing device; and when the affinity analysis result indicates that performance of executing the kernel in the first computing device is better than performance of executing the kernel in the second computing device, a size of a variable-sized portion included in a sub-task dispatched to the first computing device is set larger than a size of a variable-sized portion included in a sub-task dispatched to the second computing device.

9. The non-transitory computer readable medium of claim 8, wherein a number of the sub-tasks is equal to a number of the computing devices.

10. A non-transitory computer readable medium storing a program code that, when executed by a heterogeneous computing system, causes the heterogeneous computing system to execute following steps:
receiving a task, wherein the task comprises a kernel and a plurality of data items to be processed by the kernel;

dynamically partitioning the task into a plurality of sub-tasks, each having the kernel and a variable-sized portion of the data items, wherein the data items of the task are partitioned into variable-sized portions of the sub-tasks, and variable sizes of the variable-sized portions are dynamically determined; and dispatching the sub-tasks to a plurality of computing devices of the heterogeneous computing system;

wherein dynamically partitioning the task into the sub-tasks comprises:

analyzing the task to generate a task analysis result; and dynamically partitioning the task into the sub-tasks according to at least the task analyzing result, wherein the variable sizes of the variable-sized portions are dynamically set based on at least the task analysis result;

wherein the task analysis result comprises a predicted task run time for each of the computing devices; the computing devices comprise a first computing device and a second computing device; and when a predicted task run time of the task executed by the first computing device is shorter than a predicted task run time of the task executed by the second computing device, a size of a variable-sized portion included in a sub-task dispatched to the first computing device is set larger than a size of a variable-sized portion included in a sub-task dispatched to the second computing device.

11. The non-transitory computer readable medium of claim 8, wherein dynamically partitioning the task into the sub-tasks further comprises:

monitoring the computing devices to generate a device monitoring result; and dynamically partitioning the task into the sub-tasks according to at least the device monitoring result.

12. The non-transitory computer readable medium of claim 11, wherein the device monitoring result comprises an estimated task queuing delay of each of the computing devices; the computing devices comprise a first computing device and a second computing device; each sub-task dispatched to the first computing device is enqueued into a first task queue, and is dequeued from the first task queue and transmitted to the first computing device for execution; each sub-task dispatched to the second computing device is enqueued into a second task queue, and is dequeued from the second task queue and transmitted to the second computing device for execution; and when an estimated task queuing delay resulting from the first task queue is shorter than an estimated task queuing delay resulting from the second task queue, a size of a variable-sized portion included in a sub-task dispatched to the first computing device is set larger than a size of a variable-sized portion included in a sub-task dispatched to the second computing device.

13. The non-transitory computer readable medium of claim 11, wherein the device monitoring result comprises a device load of each of the computing devices; the computing devices comprise a first computing device and a second computing device; and when a device load of the second computing device is heavier than a device load of the first computing device, a size of a variable-sized portion included in a sub-task dispatched to the first computing device is set larger than a size of a variable-sized portion included in a sub-task dispatched to the second computing device.

14. The non-transitory computer readable medium of claim 11, wherein the device monitoring result comprises a device limitation of each of the computing devices; and a size of a variable-sized portion included in a sub-task dispatched to said each of the computing devices is positively correlated to a margin between a current operating status of said each of the computing devices and the device limitation of said each of the computing devices.

* * * * *